(12) United States Patent
Katayama (10) Patent No.: US 10,834,280 B2
(45) Date of Patent: Nov. 10, 2020

(54) IMAGE FORMING APPARATUS

(71) Applicant: CANON KABUSHIKI KAISHA, Tokyo (JP)

(72) Inventor: Takafumi Katayama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/415,982

(22) Filed: May 17, 2019

(65) Prior Publication Data

US 2019/0364164 A1 Nov. 28, 2019

(30) Foreign Application Priority Data

May 24, 2018 (JP) ................. 2018-099853

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *B65H 31/20* | (2006.01) | |

(52) U.S. Cl.
CPC ......... *H04N 1/00631* (2013.01); *B65H 31/20* (2013.01); *H04N 1/00588* (2013.01); *H04N 1/00806* (2013.01); *H04N 1/00814* (2013.01)

(58) Field of Classification Search
CPC ........... H04N 1/00631; H04N 1/00588; H04N 1/00806; H04N 1/00814; B65H 31/20

USPC .................................................. 358/1.1, 1.13
See application file for complete search history.

(56) References Cited

U.S. PATENT DOCUMENTS

| | | | | |
|---|---|---|---|---|
| 2012/0141153 A1* | 6/2012 | Nozaki | ............... | G03G 21/1633 399/51 |
| 2013/0044174 A1* | 2/2013 | Takemura | ................ | B41J 29/13 347/108 |

FOREIGN PATENT DOCUMENTS

JP 2004-010220 A 1/2004

\* cited by examiner

*Primary Examiner* — Douglas Q Tran
(74) *Attorney, Agent, or Firm* — Canon U.S.A., Inc. I.P. Division

(57) ABSTRACT

An image forming apparatus includes an apparatus body, a sheet stacking portion on which a sheet discharged from the apparatus body is to be stacked, an extension member, and an upper device. The extension member is rotatable about a rotating fulcrum between a first position at which the extension member is stored in the sheet stacking portion and a second position at which the extension member extends to downstream of the sheet stacking portion in a sheet discharge direction in which the sheet is discharged from the apparatus body. The upper device is disposed above the rotating fulcrum of the extension member and is supported to be openable by the apparatus body. The upper device in a closed state regulates a rotation of the extension member from the first position toward the second position.

14 Claims, 12 Drawing Sheets

IMAGE FORMING APPARATUS

BACKGROUND OF THE INVENTION

Field of the Invention

The present disclosure relates to an image forming apparatus forming an image on a sheet.

Description of the Related Art

An image forming apparatus such as a printer, a copying machine, and a multifunctional peripheral forms an image on a sheet used as a recording medium, and discharges the sheet to a sheet stacking portion such as a discharge tray. Such a discharge tray may include an extension tray to handle a sheet large in size in a sheet discharge direction, and a stopper to enhance stacking property of the discharged sheet.

When a member such as a stopper discussed in Japanese Patent Application Laid-Open No. 2004-10220 is unexpectedly rotated due to, for example, vibration during product transportation and protrudes from the discharge tray, the member may be damaged. On the other hand, using an adhesive tape, a cushioning material, etc. to regulate rotation of the member leads to increase in cost.

SUMMARY OF THE INVENTION

The present disclosure is directed to an image forming apparatus that makes it possible to prevent members from being damaged during transportation with a simple configuration.

According to an aspect of the present disclosure, an image forming apparatus includes an apparatus body, a sheet stacking portion on which a sheet discharged from the apparatus body is to be stacked, an extension member rotatable about a rotating fulcrum between a first position at which the extension member is stored in the sheet stacking portion and a second position at which the extension member extends to downstream of the sheet stacking portion in a sheet discharge direction in which the sheet is discharged from the apparatus body, and an upper device disposed above the rotating fulcrum of the extension member and supported to be openable by the apparatus body. The upper device in a closed state regulates a rotation of the extension member from the first position toward the second position.

Further features of the present disclosure will become apparent from the following description of embodiments with reference to the attached drawings.

BRIEF DESCRIPTION OF THE DRAWINGS

FIGS. 4A and 4B are side views of the image forming apparatus according to the first embodiment, where FIG. 4A illustrates a state where an operation panel is closed, and FIG. 4B illustrates a state where the operation panel is opened.

DESCRIPTION OF THE EMBODIMENTS

Some embodiments of the present disclosure are described below with reference to drawings. In the following description, an "image forming apparatus" includes a printer, a copying machine, a facsimile, and a multifunctional peripheral including functions thereof. Further, a "sheet" indicates a recording medium or a sheet member usable as a document, and includes paper such as regular paper and thick paper, a plastic film such as a sheet for an overhead projector, a special-shaped sheet such as an envelope and index paper, and a fabric.

Figure 1:
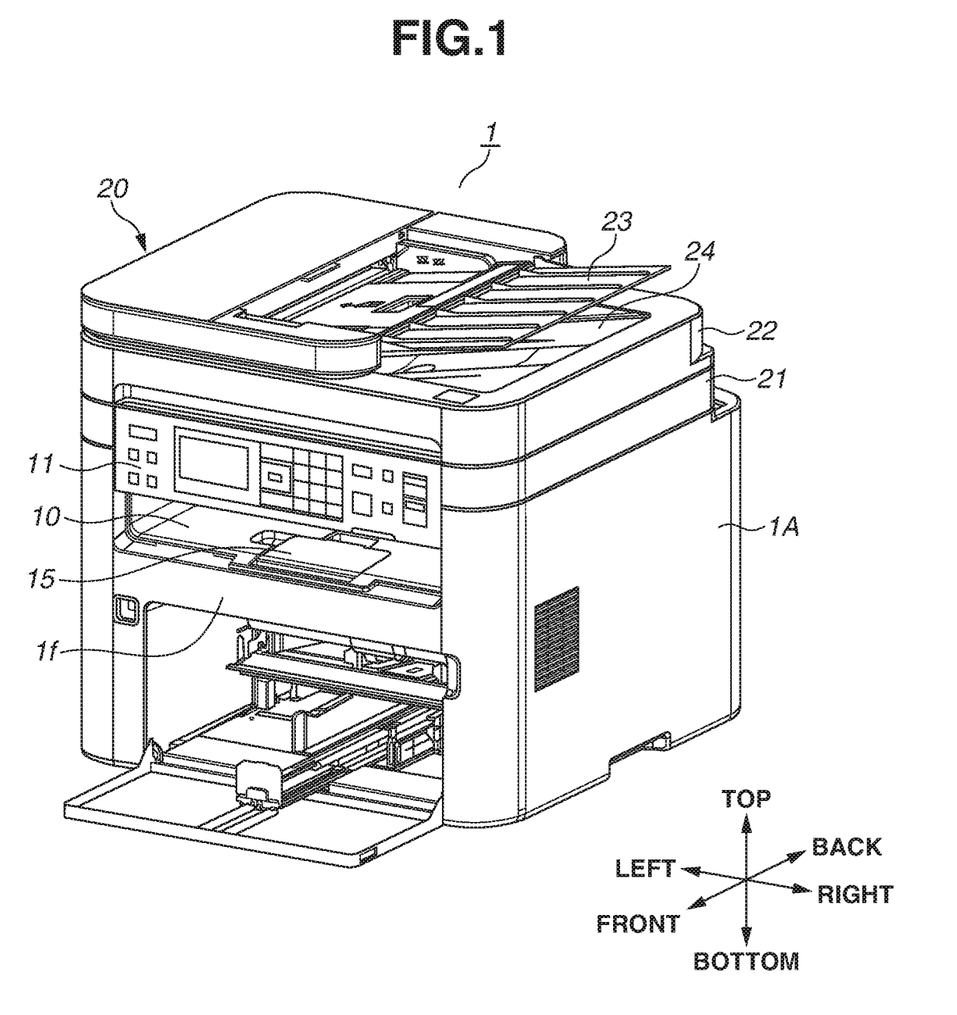
FIG. 1 is a perspective view of an image forming apparatus according to a first embodiment.
Figure 2:
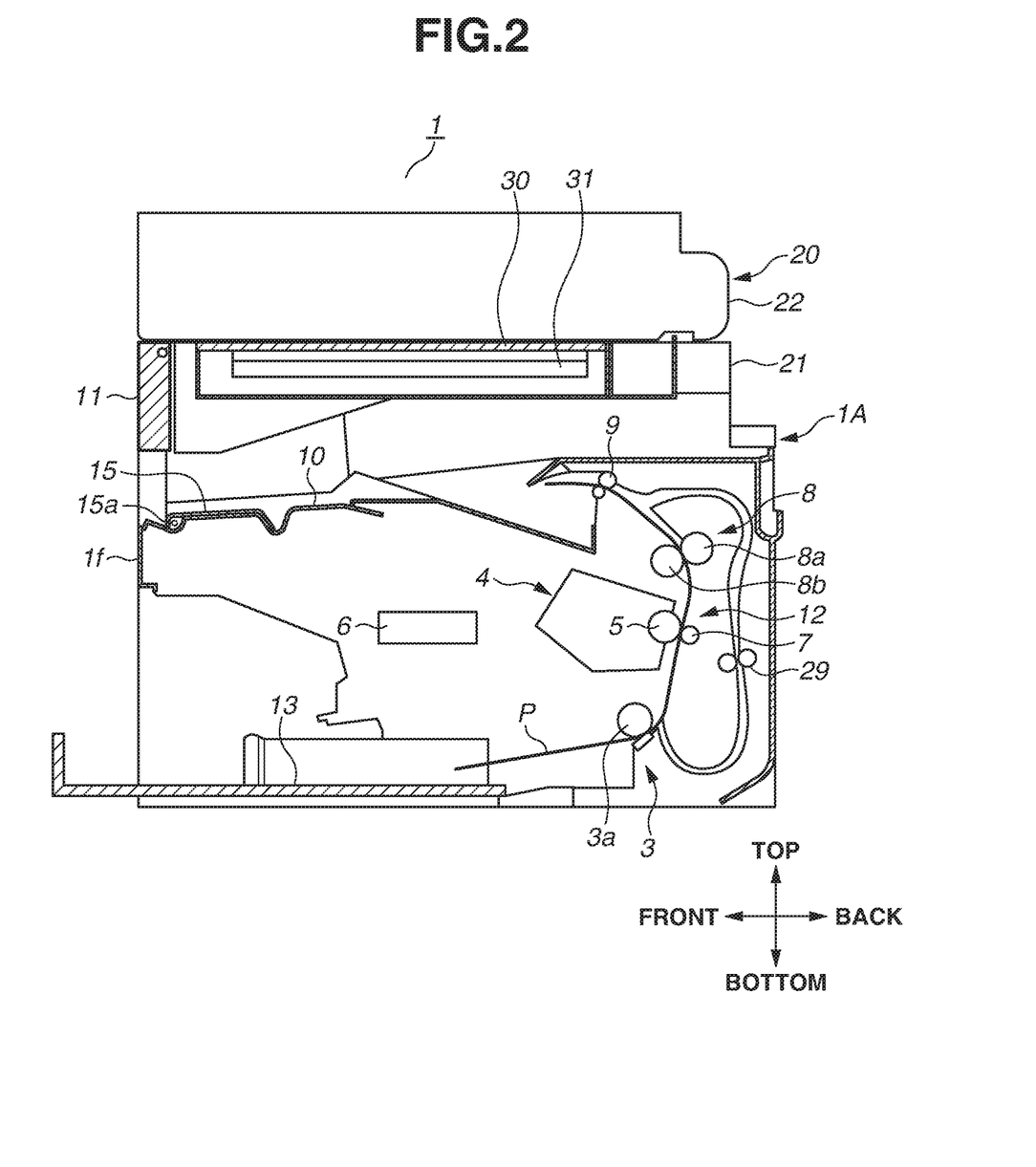
FIG. 2 is a cross-sectional view of the image forming apparatus according to the first embodiment.

First, an image forming apparatus 1 according to a first embodiment is described with reference to FIG. 1 to FIG. 9. FIG. 1 is a perspective view of the image forming apparatus 1 according to the present embodiment, and FIG. 2 is a cross-sectional view of the image forming apparatus 1. As illustrated in FIG. 1 and FIG. 2, the image forming apparatus 1 roughly includes an image forming apparatus body 1A (hereinafter, referred to as an apparatus body) including an image forming function (printing function) and an image reading apparatus 20 that reads image information from a document.

The image reading apparatus 20 includes a reading unit 21 that is integrally provided with the apparatus body 1A to configure a top part of the apparatus body 1A, and an auto document feeder (ADF) 22 that is openable/closable to the reading unit 21 (see FIG. 1). The ADF 22 includes a document tray 23 on which a document is placed, a document feeding unit that feeds a document one by one from the document tray 23, and a discharge tray 24 to which a document, image information of which has been read, is discharged. The ADF 22 is openable upward in the figure to the apparatus body 1A.

As illustrated in FIG. 2, the reading unit 21 includes a flat platen glass 30 and a reading sensor 31 that reads image information from a document placed on the platen glass 30, and is supported by a frame of the apparatus body 1A. Further, the reading sensor 31 can also read image information from a document fed by the ADF 22. The reading sensor 31 includes a light source, a photoelectric conversion device, and an optical system that applies light from the light source to a document and guides reflected light to the photoelectric conversion device.

As illustrated in FIG. 1, an operation panel 11 for a user's operation of the image forming apparatus 1 is provided on one side of the reading unit 21. In the following, with respect to the image forming apparatus 1, a side on which the user operating the operation panel 11 stands is referred to as a "front side" of the image forming apparatus 1, and a side opposite thereto is referred to as a "back side" of the image forming apparatus 1. Further, a right side when the image forming apparatus 1 is viewed from the front side is referred to as a "right side" of the image forming apparatus 1, and a side opposite thereto is referred to as a "left side" of the image forming apparatus 1. Furthermore, a vertical direction in a case where the image forming apparatus 1 is installed on a flat installation surface is referred to as a "top side" or a "bottom side" of the image forming apparatus 1.

As illustrated in FIG. 2, the apparatus body 1A includes a sheet feeder 3, a process unit 4, a transfer section 12, and a fixing section 8. The sheet feeder 3 feeds a sheet P stacked on a feeding tray 13 one by one by a feeding roller 3a. The process unit 4 performs an electrophotographic process to generate a toner image based on image information transmitted from the image reading apparatus 20 or an external computer. In other words, the process unit 4 charges a photoconductive drum 5 as a photoconductor, performs exposure by a laser scanner 6 based on the image information to form an electrostatic latent image on a surface of the photoconductive drum 5, and develops the electrostatic latent image to a toner image.

The toner image carried on the photoconductive drum 5 is transferred to the sheet P by the transfer section 12 that includes the photoconductive drum 5 and a transfer roller 7, and the transferred toner image is fixed to the sheet P by the fixing section 8. The fixing section 8 includes a fixing film 8b that heats the sheet P and a pressurizing roller 8a that presses the sheet P against the fixing film 8b, and applies heat and pressure to the toner image transferred to the sheet P. As a result, the toner is melted and is then fixed to form an image fixed to the sheet P. The above-described process unit 4 is an example of an image forming unit that forms an image on a sheet. For example, an intermediate transfer electrophotographic unit or an inkjet image forming unit can be mounted on the apparatus body 1A.

When image formation is requested to the image forming apparatus 1, the sheet P stored in the feeding tray 13 is fed by the feeding roller 3a at a predetermined timing corresponding to an operation of the process unit 4. The sheet P, to which the toner image has been transferred by the transfer section 12 and the image has been fixed by the fixing section 8, is discharged from the apparatus body 1A by discharge rollers 9, and is stacked on a discharge tray 10. In a case where double-sided printing is performed, the discharge rollers 9 are reversely rotated after conveying the sheet P by a predetermined distance to feed the sheet P to a double-sided conveyance section 29. Thereafter, the sheet P on which an image has been formed on the other surface reaches the discharge rollers 9 again and is discharged to the discharge tray 10.

The discharge tray 10 is provided below the reading unit 21 of the image reading apparatus 20 at a position overlapped with the reading unit 21 as viewed from above. In other words, in the present embodiment, the sheet P discharged by the discharge rollers 9 is discharged to a discharge space that is provided between the housing of the apparatus body 1A at a part containing the process unit 4 and the image reading apparatus 20.

An extension tray 15 provided in the image forming apparatus 1 and positional relationship between the extension tray 15 and the operation panel 11 are described. The extension tray 15 is an extension member according to the present embodiment, and the discharge tray 10 is a sheet stacking portion according to the present embodiment. The operation panel 11 is an upper device according to the present embodiment.

As illustrated in FIG. 1 and FIG. 2, the sheet P on which the image has been formed inside the apparatus body 1A is discharged toward the front side of the image forming apparatus 1. The extension tray 15 is provided on the front side (downstream side in a sheet discharge direction) of the image forming apparatus 1, which is the sheet discharge direction according to the present embodiment relative to the discharge tray 10. The extension tray 15 is rotatable with respect to the apparatus body 1A about a rotating shaft 15a that is a rotating fulcrum, and is movable to a storage position or a protrusion position as described below.

Figure 3:
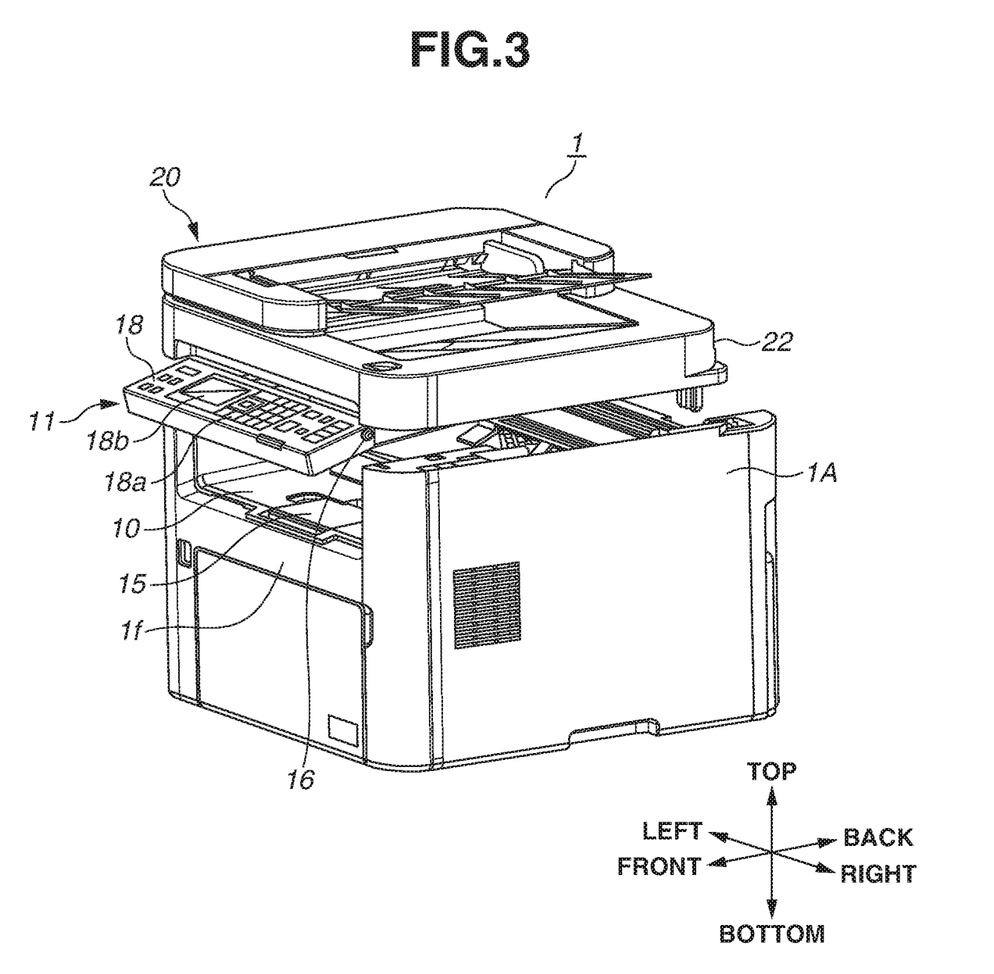
FIG. 3 is a perspective view of the image forming apparatus according to the first embodiment with illustration being partially omitted.

As illustrated in FIG. 3, the operation panel 11 is coupled, through a swing support portion 16, to a bearing provided in the reading unit 21, and is rotated with the swing support portion 16 as a rotating fulcrum. Illustration of the reading unit 21, however, is omitted in FIG. 3. A direction of a rotation axis of the swing support portion 16 is coincident with a right-left direction of the image forming apparatus 1, as with a rotation axis of the rotating shaft 15a of the extension tray 15.

Figure 4A:
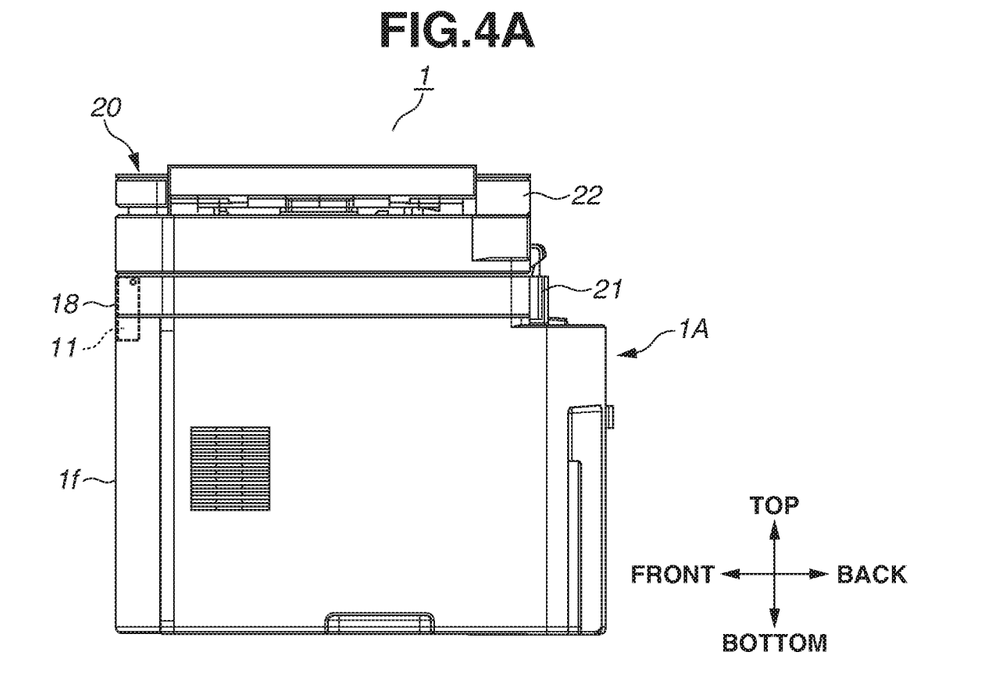
Figure 4B:
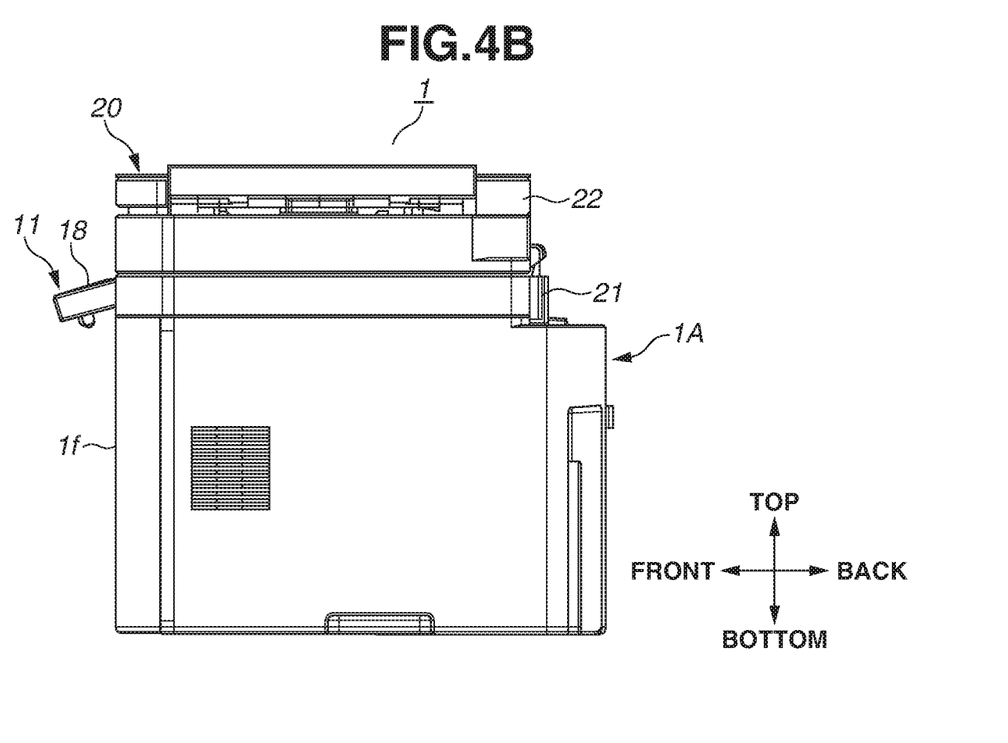

The operation panel 11 can be tilted (subjected to a tilt operation) to an arbitrary angle between positions illustrated in FIGS. 4A and 4B so as to be matched with a viewpoint height of the user. FIG. 4A illustrates a state where the operation panel 11 is closed. In this case, the operation panel 11 takes an attitude extending in a vertical direction along a downstream-side surface (i.e., front surface 1f) of the apparatus body 1A in the sheet discharge direction, and a front surface of the operation panel 11 and the front surface 1f of the apparatus body 1A become substantially flush. FIG. 4B illustrates a state where the operation panel 11 is opened. In this case, the operation panel 11 protrudes forward from the front surface 1f of the apparatus body 1A.

Further, as illustrated in FIG. 3, the front surface of the operation panel 11 is configured as an operation surface 18 including a plurality of operation keys 18a and a display 18b. The user checks a current operation state and setting information of the image forming apparatus 1 from contents displayed on the display 18b, and operates the operation keys 18a to input an instruction to the image forming apparatus 1. The instruction to the image forming apparatus 1 includes an instruction to perform a copy job that causes the image reading apparatus 20 to read image information and to form an image on the sheet, and an instruction to change a condition of the image formation (e.g., execution/inexecution of double-sided printing).

Figure 5:
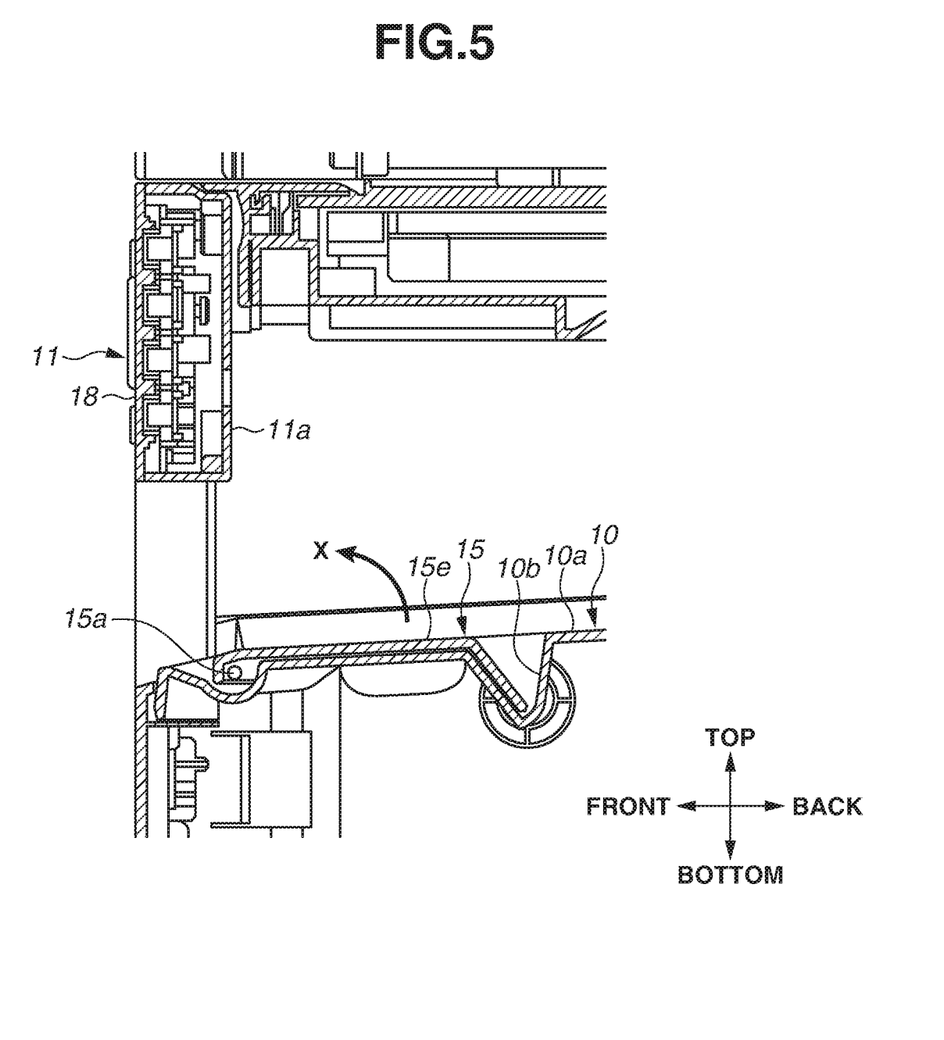
FIG. 5 is an enlarged view illustrating a vicinity of an extension tray according to the first embodiment.
Figure 6:
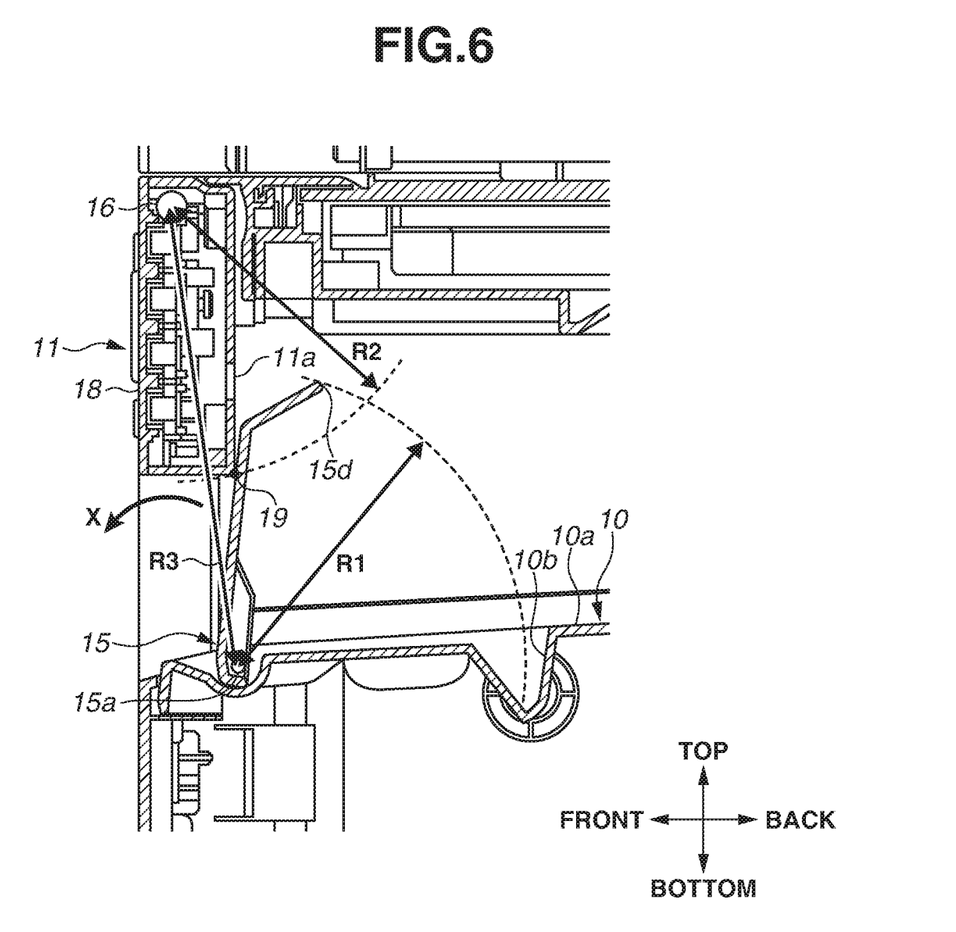
FIG. 6 is an enlarged view illustrating the vicinity of the extension tray according to the first embodiment.
Figure 7:
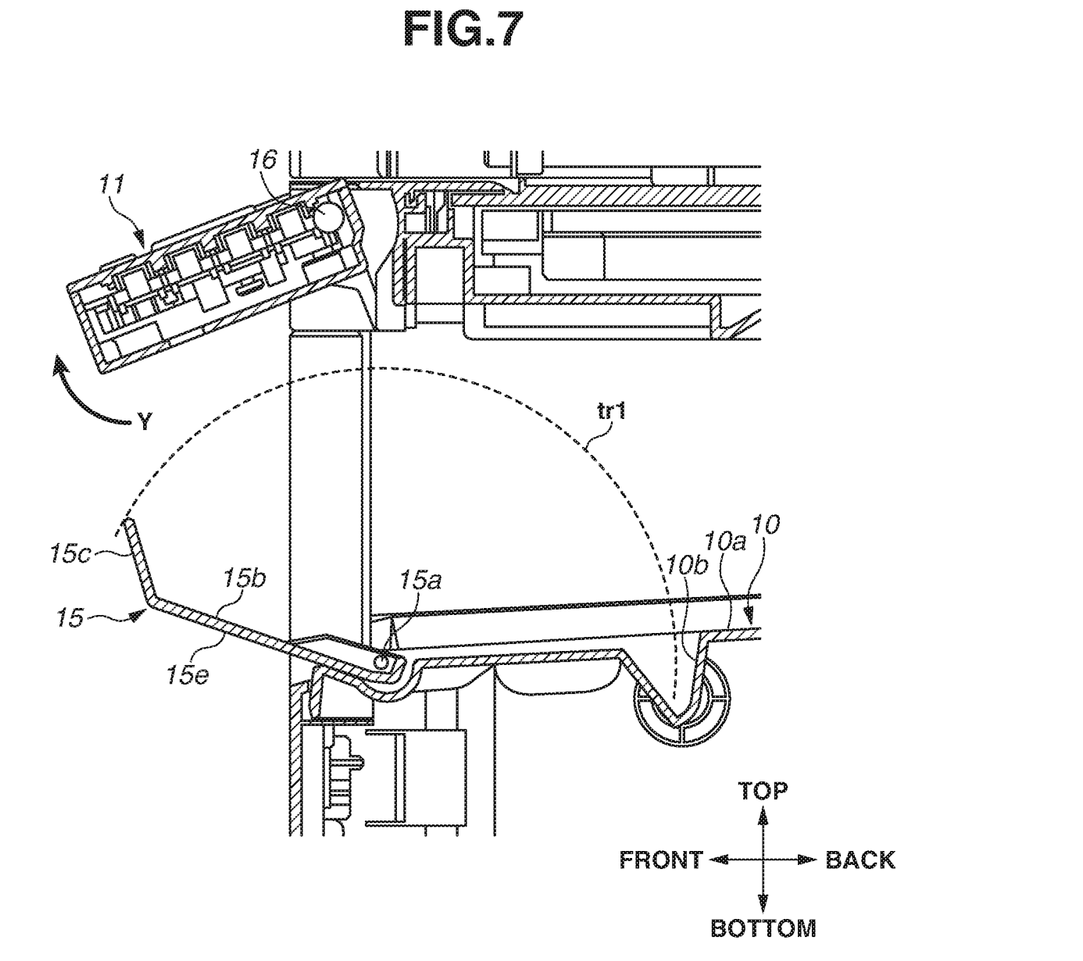
FIG. 7 is an enlarged view illustrating the vicinity of the extension tray according to the first embodiment.

FIG. 5 to FIG. 7 are enlarged cross-sectional views each illustrating a vicinity of the extension tray 15 and the operation panel 11 in FIG. 2 in an enlarged manner. The extension tray 15 is movable to a storage position (FIG. 5) at which the extension tray 15 is stored in the discharge tray 10 and a protrusion position (FIG. 7) at which the extension tray 15 protrudes to the downstream of the discharge tray 10 in the sheet discharge direction. The extension tray 15 is rotated in an X direction in the figures from the storage position to the protrusion position.

The extension tray 15 includes a support surface 15b that supports the sheet P together with a stacking surface 10a of the discharge tray 10, a rear surface 15e on an opposite side of the support surface 15b, and a regulation portion 15c that protrudes upward from the support surface 15b in a state where the extension tray 15 is at the protrusion position. The regulation portion 15c functions as a stopper that comes into contact with a downstream end in the sheet discharge direction of the sheet P discharged to the discharge tray 10, to regulate movement of the sheet P in the sheet discharge direction. The discharge tray 10 includes a recessed portion 10b recessed downward from the stacking surface 10a to store the regulation portion 15e when the extension tray 15 is at the storage position. Further, when the extension tray 15 is at the storage position (FIG. 5), the extension tray 15 can support the sheet by the rear surface 15e, together with the discharge tray 10.

As illustrated in FIG. 6, when the extension tray 15 is rotated in the X direction from the storage position to the protrusion position while the operation panel 11 is closed, the extension tray 15 comes into contact with a rear surface 11a of the operation panel 11. More specifically, the extension tray 15 and the operation panel 11 are configured to satisfy the following expression:

$$R1+R2>R3,$$

where R1 is a rotation radius of the extension tray 15, R2 is a rotation radius of the operation panel 11, and R3 is a distance between the rotating fulcrum of the extension tray 15 and the rotating fulcrum of the operation panel 11. The rotation radius R1 of the extension tray 15 and the rotation radius R2 of the operation panel 11 each indicate a radius of an arc drawn by an end part (15d and 19) farthest from the rotating fulcrum of each of the members as viewed from an axis direction of the respective rotating fulcrums.

To move the extension tray 15 to the protrusion position, the user rotates and opens the operation panel 11 to retreat the operation panel 11 from a rotation locus tr1 of the extension tray 15. Thereafter, the extension tray 15 is rotated to the protrusion position to protrude to outside of the apparatus body 1A. As a result, the extension tray 15 can support the sheet together with the discharge tray 10, on the downstream of the discharge tray 10 in the sheet discharge direction.

As described above, in the present embodiment, when the extension member (extension tray 15) is rotated from a first position (storage position) to a second position (protrusion position) while the upper device (operation panel 11) is closed, the extension member comes into contact with the upper device. Therefore, even if the extension tray 15 is rotated due to, for example, vibration during transportation of the image forming apparatus 1, rotation of the extension tray 15 is regulated by the operation panel 11 located on the rotation locus of the extension tray 15.

If the image forming apparatus 1 is transported while the extension tray 15 protrudes from the discharge tray 10, the extension tray 15 may come into contact with a worker or surrounding articles, and may be accordingly damaged or deformed. Further, if a member such as an adhesive tape and a cushioning material is used to regulate unexpected rotation of the extension tray 15, the cost is increased. According to the configuration of the present embodiment, unexpected rotation of the extension tray can be regulated by a simple configuration that regulates the positional relationship between the operation panel 11 and the extension tray 15, which makes it possible to prevent the extension tray 15 from being damaged during transportation. In particular, in the present embodiment, since rotation of the extension tray 15 is regulated while the whole of the extension tray 15 is located on the back side of the front surface 1f of the apparatus body 1A (FIG. 8), it is possible to more assuredly prevent damage of the extension tray 15.

A force necessary/sufficient to open the operation panel 11 from the one in the closed state is equivalent to a force enough to prevent the operation panel 11 from being opened if the extension tray 15 accidentally collides with the operation panel 11. In this case, it is preferable that a load to rotate the operation panel 11 from a predetermined angle be made larger than the other angle by a hinge device including a click mechanism as the swing support portion 16, or the operation panel 11 be attracted to the apparatus body 1A by a magnet. As a result, it is possible to more assuredly prevent the operation panel 11 in the closed state from being unexpectedly opened. Further, in the present embodiment, the operation panel 11 in the closed state is substantially flush with the front surface 1f of the apparatus body 1A. Therefore, providing one packing material so as to face both of the operation panel 11 and the front surface 1f makes it possible to easily prevent rotation of the operation panel 11 during transportation.

Figure 8:
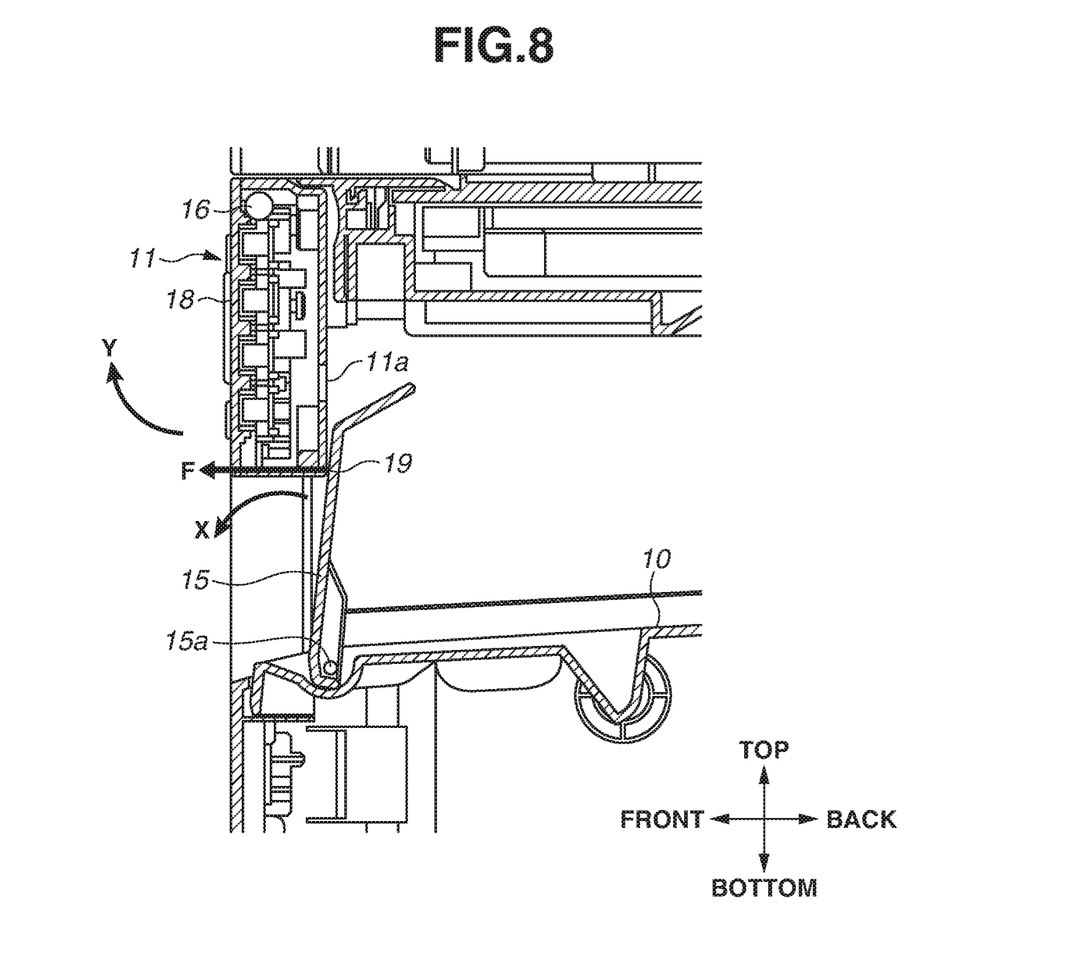
FIG. 8 is an enlarged view illustrating the vicinity of the extension tray according to the first embodiment.

In the above description with reference to FIG. 7, the user rotates the extension tray 15 to the protrusion position after the user opens the operation panel 11; however, the user can rotate the extension tray 15 and the operation panel 11 in a rotation operation for the extension tray 15. In other words, as illustrated in FIG. 8, the user can rotate the extension tray 15 in the X direction in the figure from the storage position and bring the extension tray 15 into contact with a contact portion 19 on the rear surface 11a of the operation panel 11 in the closed state, and then further rotate the extension tray 15 in the X direction. The operation panel 11 is rotated in a Y direction in the figure by force F applied from the extension tray 15.

Figure 9:
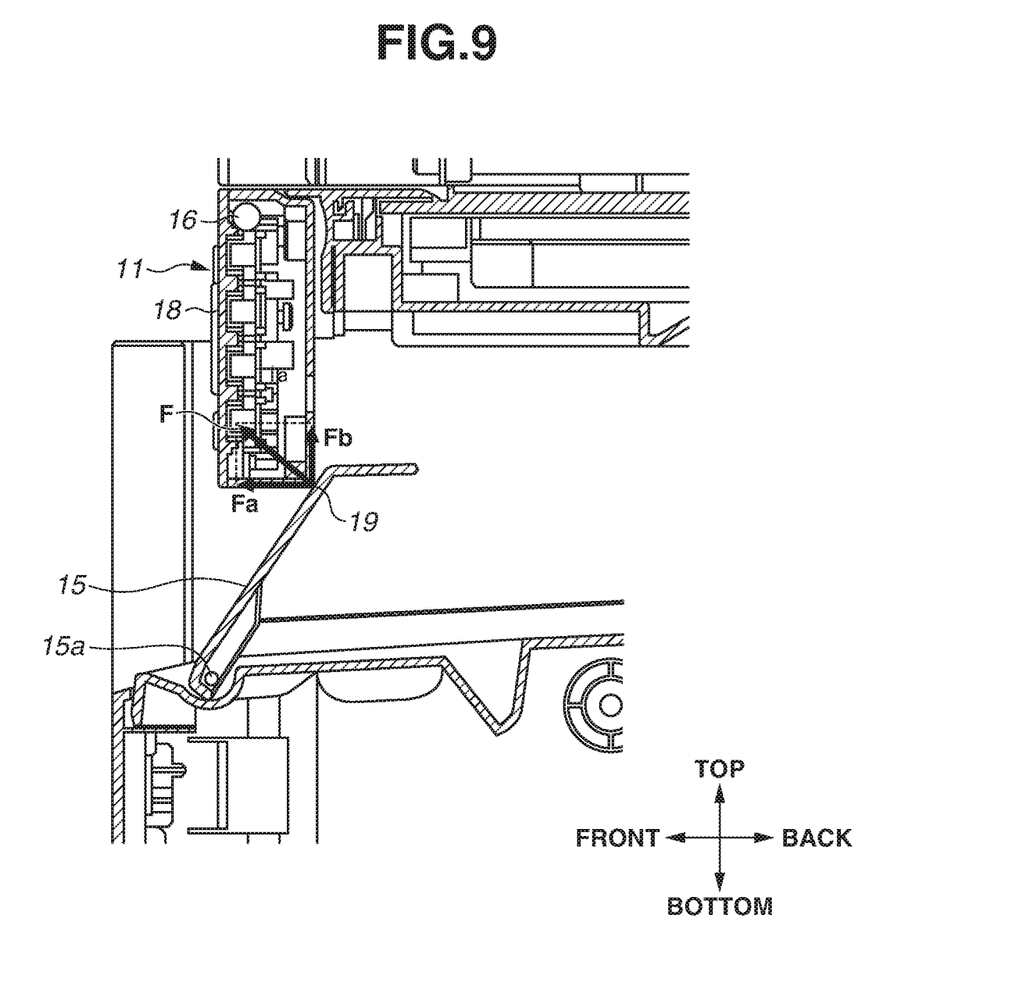
FIG. 9 is an enlarged view illustrating a vicinity of an extension tray according to a modification of the first embodiment.

In this case, in the present embodiment, the rotating shaft 15a of the extension tray 15 is provided on upstream of the swing support portion 16 of the operation panel 11 in the sheet discharge direction. Further, a direction of the force F applied from the extension tray 15 to the operation panel 11 in the closed state at the contact portion 19 is a substantially horizontal direction. The direction is substantially coincident with a rotating direction of the contact portion 19 at the time when the operation panel 11 starts to open. If the rotating shaft 15a of the extension tray 15 is located on the downstream of the swing support portion 16 of the operation panel 11 in the sheet discharge direction as illustrated in FIG. 9, the force F applied from the extension tray 15 to the contact portion 19 of the operation panel 11 contains a large amount of upward component Fb, as compared with the present embodiment. As a result, a component Fa in the horizontal direction of the force F becomes small, and it is accordingly necessary to operate the extension tray 15 with strong force in order to rotate the operation panel 11. In contrast, according to the present embodiment, rotation of the extension tray 15 and the operation panel 11 is achieved with relatively weak force, which makes it possible to improve/refine operability as compared with a modification in FIG. 9.

An image forming apparatus according to a second embodiment is described with reference to FIG. 10 to FIG. 12. The present embodiment is different from the first embodiment in that the image reading apparatus is openable/closable with respect to the apparatus body of the image forming apparatus and unexpected protrusion of the extension tray is regulated by the image reading apparatus in the closed state. The elements having configurations and action similar to the elements according to the first embodiment are denoted by the same reference numerals as in the first embodiment, and description of such elements is omitted.

Figure 10:
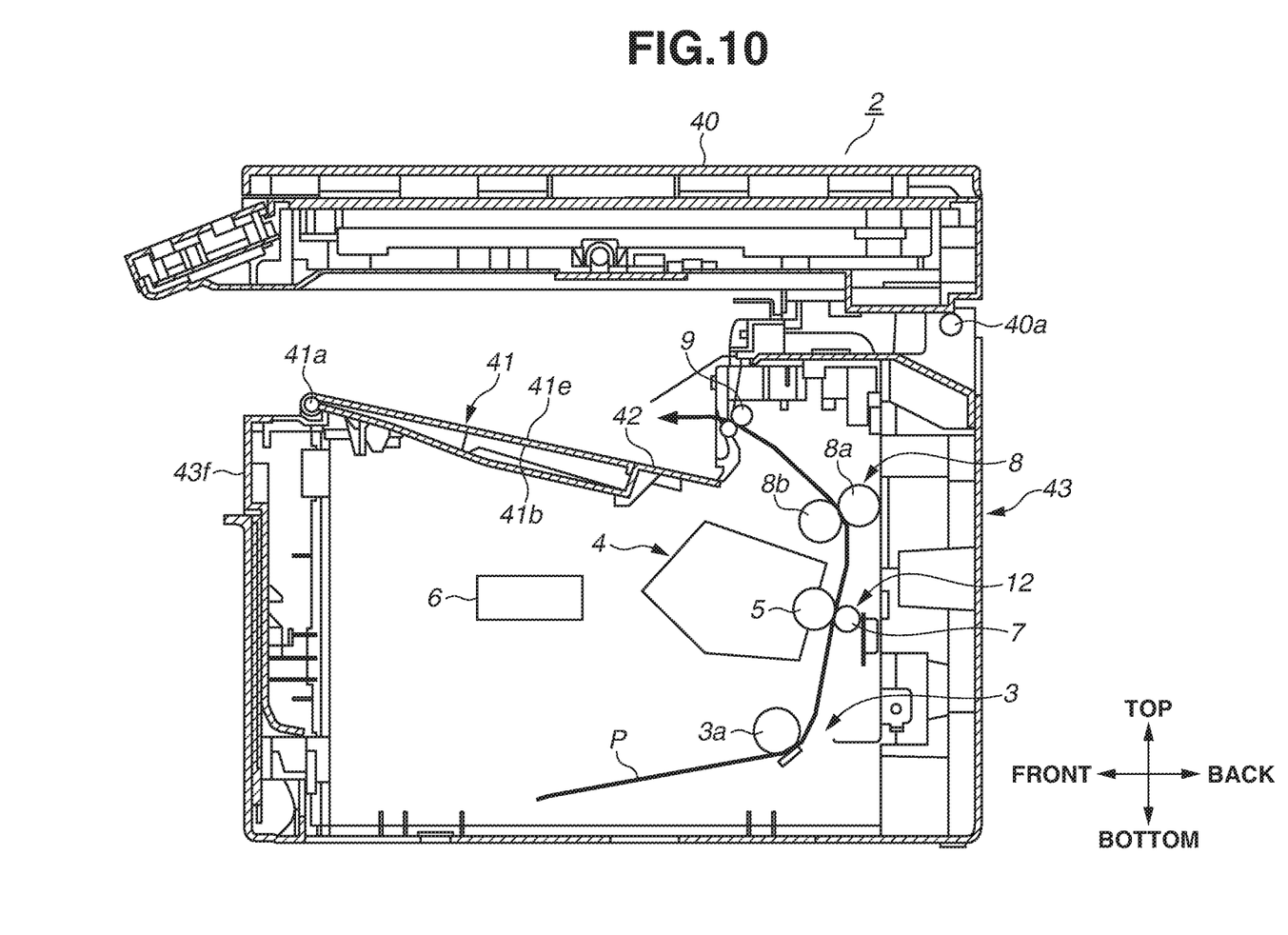
FIG. 10 is a cross-sectional view of an image forming apparatus according to a second embodiment.

As illustrated in FIG. 10, an apparatus body 43 of an image forming apparatus 2 according to the present embodiment houses the sheet feeder 3, the process unit 4, the transfer section 12, and the fixing section 8. As with the first embodiment, a toner image formed by the process unit 4 is transferred to the sheet P fed from the sheet feeder 3 by the transfer section 12, and the image is fixed by the fixing section 8. A discharge tray 42 that is a sheet stacking portion according to the present embodiment is provided on a top surface of the apparatus body 43. The sheet P passed through the fixing section 8 is discharged from the apparatus body 43 by the discharge rollers 9, and is stacked on the discharge tray 42.

An extension tray 41 that is an extension member according to the present embodiment is rotatable with respect to the discharge tray 42, about a rotating shaft 41a provided at a downstream end in the sheet discharge direction as a rotating fulcrum. The extension tray 41 is movable to a storage position (FIG. 10) at which the extension tray 41 is stored in the discharge tray 42 and a protrusion position (FIG. 12) at which the extension tray 41 protrudes to the downstream in the sheet discharge direction from a front surface 43f of the apparatus body 43. The extension tray 41 moves through an upper part of the rotating shaft 41a between the storage position and the protrusion position.

As illustrated in FIG. 10, the extension tray 41 at the storage position can support the sheet together with the discharge tray 42, by a rear surface 41e on an opposite side of a support surface 41b. On the other hand, as illustrated in FIG. 12, the extension tray 41 at the protrusion position supports the sheet by the support surface 41b together with the discharge tray 42, and regulates movement of the sheet in the sheet discharge direction by a regulation portion 41c.

Figure 12:
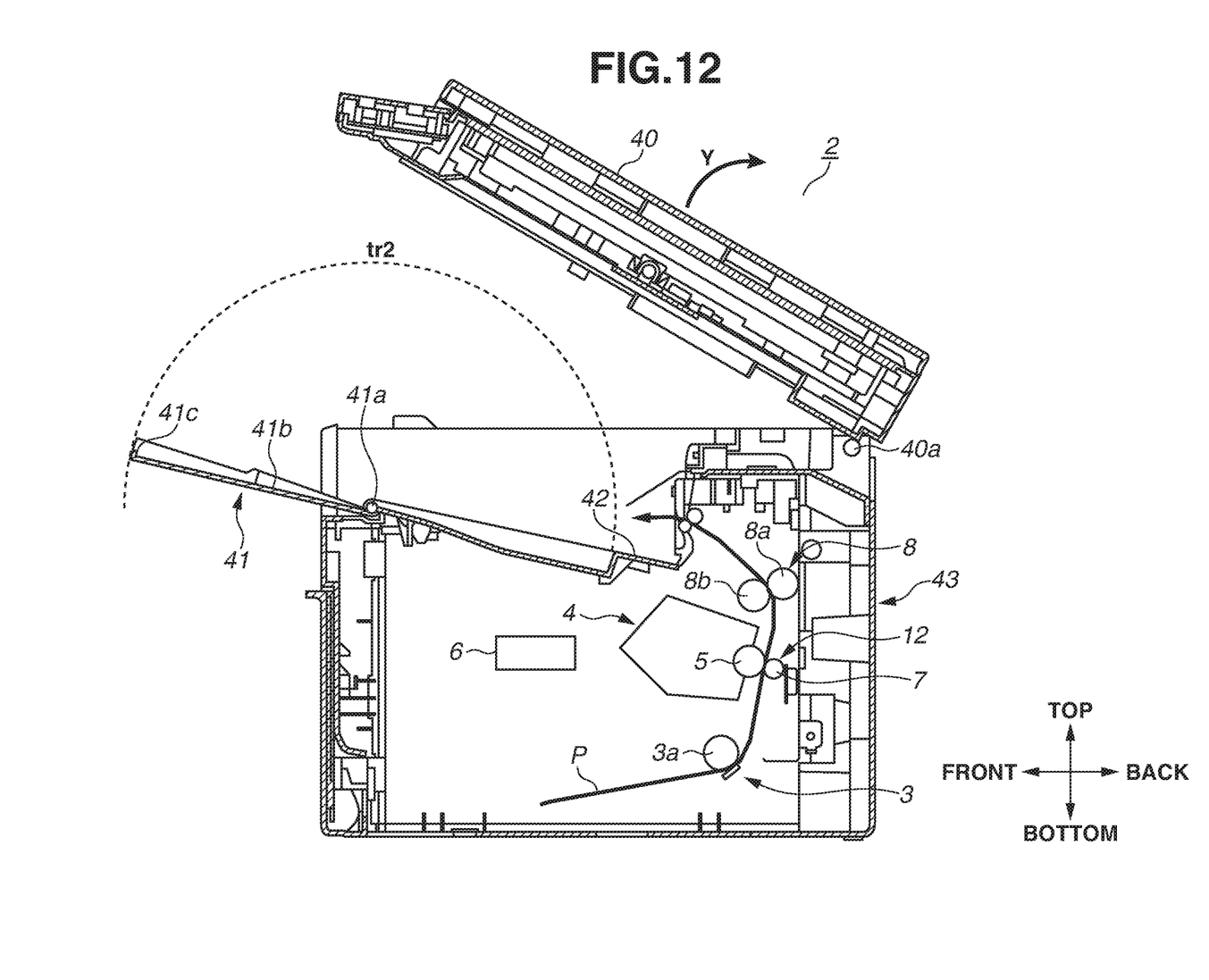
FIG. 12 is a cross-sectional view of the image forming apparatus according to the second embodiment.

As illustrated in FIG. 10 and FIG. 12, an image reading apparatus 40 according to the present embodiment is provided so as to be openable/closable with respect to the apparatus body 43 by being rotated about the rotating shaft 40a with respect to the apparatus body 43. When the image reading apparatus 40 is closed (FIG. 10), the image reading apparatus 40 takes an attitude substantially horizontal to an installation surface of the apparatus body 43, and the discharge tray 42 is covered with the image reading apparatus 40 as viewed from above. When the image reading apparatus 40 is rotated upward (FIG. 12), an upper part of the discharge tray 42 is opened.

Figure 11:
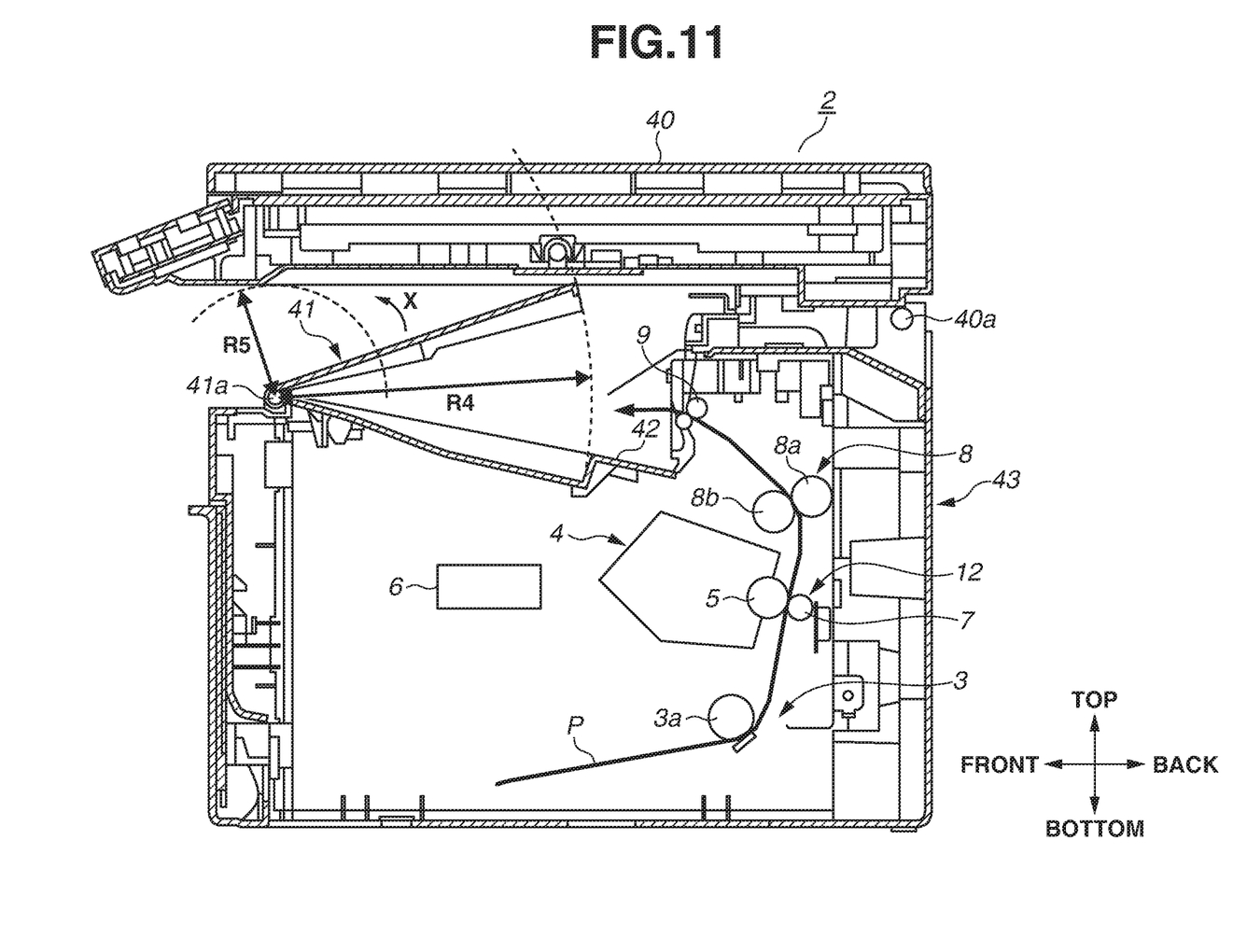
FIG. 11 is a cross-sectional view of the image forming apparatus according to the second embodiment.

As illustrated in FIG. 11, when the extension tray 41 is rotated from the storage position to the protrusion position while the image reading apparatus 40 is closed, the extension tray 41 comes into contact with a bottom part of the image reading apparatus 40. In other words, rotation of the extension tray 41 as the extension member is regulated by the image reading apparatus 40 that is an upper device according to the present embodiment. More specifically, the extension tray 41 and the image reading apparatus 40 are configured to satisfy the following expression:

$$R4 > R5,$$

where R4 is a rotation radius of the extension tray 41, and R5 is a distance from the rotating shaft 41a of the extension tray 41 to the image reading apparatus 40 in the vertical direction.

To move the extension tray 41 to the protrusion position, the image reading apparatus 40 is rotated in the Y direction as illustrated in FIG. 12. As a result, the image reading apparatus 40 is retreated from a rotation locus tr2 of the extension tray 41, which allows for movement of the extension tray 41 to the protrusion position.

As described above, in the present embodiment, when the extension member (extension tray 41) is rotated from the first position (storage position) to the second position (protrusion position) while the upper device age reading apparatus 40) is closed, the extension member comes into contact with the upper device. Therefore, even if the extension tray 41 is rotated due to, for example, vibration during transportation of the image forming apparatus 2, the image reading apparatus 40 prevents the extension tray 41 from unexpectedly protruding toward outside of the image forming apparatus 2. This makes it possible to prevent the extension tray 41 from being damaged, with a simple configuration as with the first embodiment.

In the present embodiment, the case where the image reading apparatus 40 is disposed to be overlapped with the rotating shaft 41a of the extension tray 41 as viewed from above has been described; however, the configuration is not limited thereto as long as the image reading apparatus 40 in the closed state regulates movement of the extension tray 41 to the protrusion position. For example, the downstream end of the image reading apparatus 40 in the sheet discharge direction may not extend to the rotating shaft 41a of the extension tray 41, and the upper part of the rotating shaft 41a may be opened. In this case, it is sufficient to make the minimum distance from the rotating shaft 41a to the image reading apparatus 40 in the closed state smaller than the rotation radius R4 of the extension tray 41.

In the above-described first and second embodiments, the operation panel and the image reading apparatus have been described as examples of the openable/closable upper device; however, the present technology can be applied to a configuration including other upper devices. For example, in a case where a plurality of discharge trays is disposed in a top-down direction, the discharge tray located above the other discharge tray provided with the extension tray can be openable/closable. Further, the "extension member" is not limited to the member including both of the support surface and the regulation portion (stopper) as described in the first and second embodiments, and can be a member solely supporting a sheet or a member solely regulating movement of a sheet.

According to the present embodiments, it is possible to prevent a member from being damaged during transportation with a simple configuration.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No, 2018-099853, filed May 24, 2018, which is hereby incorporated by reference herein in its entirety.

What is claimed is:

1. An image forming apparatus comprising:
an apparatus body;
a sheet stacking portion on which a sheet discharged from the apparatus body is to be stacked;
an extension member on which a sheet discharged from the apparatus body is to be stacked, wherein the extension member is rotatable about a rotating fulcrum of the extension member and between a first position and a second position, and wherein an area on which the sheet is stacked in a case that an extension stacking member is at the second position is broader than an area on which the sheet is stacked in a case that the extension stacking member is at the first position; and
an operation panel configured to receive an instruction of an input operation with respect to the image forming apparatus and is moveable with respect to the apparatus body,
wherein the operation panel in a first state regulates a rotation of the extension member from the first position toward the second position, and wherein the operation panel in a second state allows the extension member to be rotated from the first position to the second position.

2. The image forming apparatus according to claim 1, wherein the operation panel is rotatable about a rotating fulcrum of the operation panel that is located above the rotating fulcrum of the extension member, and wherein a sum of a rotation radius of the operation panel and a rotation radius of the extension member is larger than a distance between the rotating fulcrum of the operation panel and the rotating fulcrum of the extension member.

3. The image forming apparatus according to claim 2, wherein the operation panel in the first state takes an attitude along a downstream-side surface of the apparatus body in a sheet discharge direction, and the operation panel in the second state protrudes to a downstream in the sheet discharge direction from the downstream-side surface of the apparatus body.

4. The image forming apparatus according to claim 2, wherein the rotating fulcrum of the extension member is located upstream of the rotating fulcrum of the operation panel in a sheet discharge direction.

5. The image forming apparatus according to claim 1, wherein the extension member located at the second position protrudes to downstream in a sheet discharge direction from a downstream-side surface of the apparatus body in the sheet discharge direction, and wherein, when the extension member is rotated from the first position to the second position while the operation panel is in the first state, the extension member comes into contact with the operation panel while the whole of the extension member is located upstream of the downstream-side surface of the apparatus body in the sheet discharge direction.

6. The image forming apparatus according to claim 1, wherein, in a case where the extension member is located at the second position, the extension member includes a support surface configured to support, together with the sheet stacking portion, the sheet discharged from the apparatus body.

7. The image forming apparatus according to claim 1, wherein, in a case where the extension member is located at the second position, the extension member includes a regulation portion that comes into contact with a downstream end in a sheet discharge direction of the sheet discharged from the apparatus body to regulate movement of the sheet in the sheet discharge direction.

8. The image forming apparatus according to claim 1, wherein at least a part of the operation panel is above the rotating fulcrum of the extension member.

9. The image forming apparatus according to claim 1, wherein the extension member in the first position is stored in the sheet stacking portion.

10. The image forming apparatus according to claim 1, further comprising an image reading apparatus configured to read image information from a document, wherein the operation panel is rotatably supported by the image reading apparatus.

11. An image forming apparatus comprising:

an apparatus body;

a sheet stacking portion on which a sheet discharged from the apparatus body is to be stacked;

an extension member on which a sheet discharged from the apparatus body is to be stacked, wherein the extension member is rotatable about a rotating fulcrum of the extension member and between a first position and a second position, and wherein an area on which the sheet is stacked in a case that an extension stacking member is at the second position is broader than an area on which the sheet is stacked in a case that the extension stacking member is at the first position; and an image reading apparatus configured to read image information from a document and is moveable with respect to the apparatus body, wherein the image reading apparatus in a first state regulates a rotation of the extension member from the first position toward the second position, and wherein the image reading apparatus in a second state allows the extension member to be rotated from the first position to the second position.

12. The image forming apparatus according to claim 11, wherein the image reading apparatus in the first state and the extension member located at the first position are overlapped with each other as viewed from above, and wherein a rotation radius of the extension member is larger than a distance from the rotating fulcrum of the extension member to the image reading apparatus in the first state in a vertical direction.

13. The image forming apparatus according to claim 11, wherein at least a part of an operation panel is above the rotating fulcrum of the extension member.

14. The image forming apparatus according to claim 11, wherein the extension member in the first position is stored in the sheet stacking portion.

\* \* \* \* \*